Feb. 9, 1926.
L. C. BAYLES
1,571,992
THROTTLE VALVE
Filed July 9, 1923
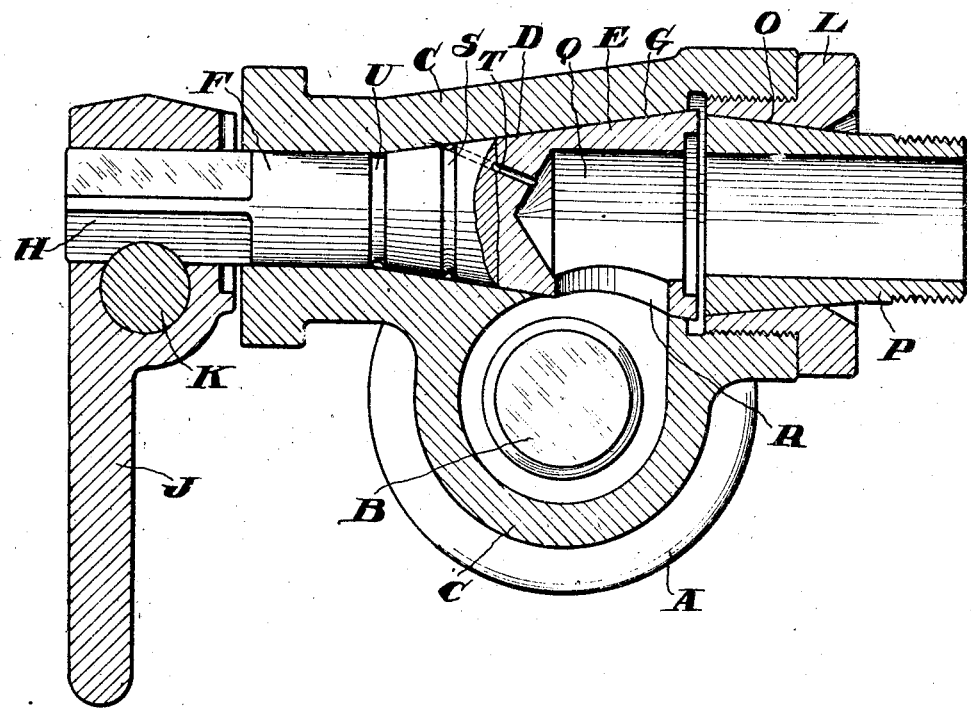
INVENTOR
Lewis C. Bayles
BY
Herbert G. Ogden
HIS ATTORNEY Patented Feb. 9, 1926.

1,571,992

UNITED STATES PATENT OFFICE.

LEWIS C. BAYLES, OF EASTON, PENNSYLVANIA, ASSIGNOR TO INGERSOLL-RAND COMPANY, OF JERSEY CITY, NEW JERSEY, A CORPORATION OF NEW JERSEY.

THROTTLE VALVE.

Application filed July 9, 1923. Serial No. 650,352.

*To all whom it may concern:*

Be it known that I, LEWIS C. BAYLES, a citizen of the United States, and a resident of Easton, county of Northampton, and State of Pennsylvania, have invented a certain Throttle Valve, of which the following is a specification accompanied by drawings.

This invention relates to throttle valves for controlling the passage of pressure fluid through a pipe line or to a machine.

Throttle valves having a tapered body portion, through which pressure fluid passes, have a tendency to be forced so tightly to their seats by the pressure fluid, that they cannot be readily turned unless some means is provided for reducing the pressure along the tapered fit. Lubrication in these valves is practically impossible as pressure fluid soon blows all lubricant from the bearing surface. This invention has for its main object the elimination of the above objectionable features, by producing a valve within which the pressure forcing the valve to its seat is reduced, whereby the valve may be readily turned on and off and lubrication retained for a longer period of time.

Further objects of the invention will hereinafter appear, and to all of these ends the invention is illustrated in the accompanying drawings, in which the figure is a vertical section of a valve applied to a rock drill.

Referring to the drawings, A designates the cylinder of a rock drill in which the differential piston B is adapted to reciprocate, and to which cylinder the back head C is secured in any suitable manner. A throttle valve D in the form of a one piece plug, has a tapered portion E and a straight or untapered portion F, and is inserted in the tapered bore G formed in the back head C. The straight or untapered portion F of the valve is squared as at H, and the handle J is secured thereto in any suitable manner, as by the pin K. A gland nut L is threaded into the back head C and has an inwardly tapered bore O, forming a seat for a swivel member P, through which pressure fluid may pass to the valve D.

In this instance, the throttle valve D is formed with a recess Q, having one end closed, and a lateral port R for admitting motive fluid to the piston B. The pressure against the large end of the tapered valve D has a tendency to force the valve so tightly into the tapered bore G that the lubricant is forced out from between the tapered surfaces of the valve and the bore G thus causing the valve to bind, and unless some means is provided for reducing this pressure in some degree, it is extremely difficult to turn the valve off or on. In accordance with the present invention, a circumferential groove S is formed in the tapered portion E of the valve and is in communication with the recess Q, as by means of the passage T. Instead of the tapered portion E of the valve D now being forced tightly within the bore G, the pressure is relieved by a portion of the pressure fluid passing through the passage T to the circumferential groove S. The total effective pressure on the valve tending to force it into the tapered bore G is reduced by an amount equal to the cross sectional area of the edge of the groove S multiplied by the unit pressure, while in a valve, in which no means is provided for reducing the pressure, the total effective pressure would be approximately the product of the area of the large end multiplied by the unit pressure, which is more than twice as great.

As the pressure at the large end of the valve D is always equal to the pressure in the circumferential groove S there is no flow of air along the intermediate portion of the valve tending to carry the lubricant from the bearing surface. A circumferential groove U is in this instance formed between the tapered portion E and the straight or untapered portion F of the valve for the purpose of grinding, and by means of the circumferential groove S and passage T, the greater portion of the pressure is taken up in the area between the circumferential grooves S and U, so that the greater area of the valve is free to turn easily, and loss of lubricant materially prevented.

I claim:

1. A throttle valve comprising a one piece plug having a tapered bearing portion and a straight bearing portion, a recess extending partly through the plug, a port for permitting the passage of pressure fluid from the recess, a circumferential groove formed on the tapered portion of the plug between the ends of said tapered portion, and a passage through the plug for admitting pressure fluid from the recess to the groove, thereby reducing the holding pressure against the plug to prevent any lubricant existing between the plug and its seat from being forced out from therebetween.

2. A throttle valve comprising a one piece plug having a tapered bearing portion adapted to be forced to its seat by fluid pressure and a straight bearing portion for centralizing the plug, a recess extending partly through the plug, a single port for permitting the passage of pressure fluid from the recess, a single circumferential groove formed on the tapered portion of the plug between the ends of said tapered portion, and a passage through the plug for admitting pressure fluid from the recess to the groove, thereby reducing the holding pressure against the plug to prevent any lubricant deposited between the plug and its seat from being forced out from therebetween when the plug is closed, and a handle for manipulating the plug.

In testimony whereof I have signed this specification.

LEWIS C. BAYLES.